(12) United States Patent
Chen et al.

(10) Patent No.: US 11,487,293 B2
(45) Date of Patent: Nov. 1, 2022

(54) MAP-INFORMATION OBSTACLE-TRACKING SYSTEM AND METHOD

(71) Applicant: AUTOMOTIVE RESEARCH & TESTING CENTER, Changhua County (TW)

(72) Inventors: Ying-Ren Chen, Changhua County (TW); Siang-Min Siao, Changhua County (TW)

(73) Assignee: Automotive Research & Testing Center, Lugang (TW)

( * ) Notice: Subject to any disclaimer, the term of this patent is extended or adjusted under 35 U.S.C. 154(b) by 98 days.

(21) Appl. No.: 16/953,619

(22) Filed: Nov. 20, 2020

(65) Prior Publication Data

US 2022/0163970 A1 May 26, 2022

(51) Int. Cl.
*G05D 1/02* (2020.01)

(52) U.S. Cl.
CPC ......... *G05D 1/0214* (2013.01); *G05D 1/0274* (2013.01); *G05D 1/0251* (2013.01); *G05D 2201/0213* (2013.01)

(58) Field of Classification Search
CPC .. G05D 1/0214; G05D 1/0274; G05D 1/0251; G05D 2201/0213
See application file for complete search history.

(56) References Cited

U.S. PATENT DOCUMENTS

| 2020/0174487 A1* | 6/2020 | Viswanathan | G05D 1/0221 |
| 2020/0211394 A1* | 7/2020 | King | G05D 1/0289 |
| 2020/0299934 A1* | 9/2020 | Ono | E02F 3/84 |

* cited by examiner

*Primary Examiner* — Rodney A Butler
(74) *Attorney, Agent, or Firm* — Rosenberg, Klein & Lee (57) ABSTRACT

A map-information obstacle-tracking system and a method thereof are provided. The system is installed in a vehicle. The method includes: using a vehicular dynamic positioning module to acquire a position of a vehicle, and using a map-information module to acquire map-information routes of an area neighboring the position of the vehicle; comparing position of the vehicle with the map-information routes to find out candidate routes in the moving direction of the vehicle; determining one of the candidate routes where said obstacle appears, and predicting a moving trajectory of the obstacle; estimating and outputting a position of the obstacle. The present invention is characterized in using map-information and able to acquire the curvature and slope of the front curved lane. Therefore, the present invention can improve the precision of the obstacle position and stabilizes the accuracy of detecting an obstacle in a curved lane.

15 Claims, 6 Drawing Sheets

MAP-INFORMATION OBSTACLE-TRACKING SYSTEM AND METHOD

BACKGROUND OF THE INVENTION

Field of the Invention

The present invention relates to a driver assistance technology, particularly to a map-information obstacle-tracking system and method thereof.

Description of the Prior Art

The driver assistance system of vehicles can detect obstacles ahead and use a filter mechanism to estimate the current positions of the obstacles according to the information of the obstacles in the past time points. However, the conventional driver assistance systems still have drawbacks in the car-following models on curved lanes. For example, while a front car has not entered a curved lane yet or has entered a curved lane, the system cannot ascertain when the obstacle (i.e. the front car) will turn into a curved lane for the first time or turn its direction once again. Thus, the predicted position of the obstacle has larger deviation with respect to the real position of the obstacle. Consequently, the accuracy of the detection results of the curved lanes can be unstable. For example, the obstacle may disappear and then reappear.

In the conventional detection systems, the factors may cause following unstable detection results: 1. Limited viewing angle and visible distance of a camera affects the identification of traffic lanes and obstacles; 2. Steel rods and guardrails are likely to affect radars and cause misjudgments; 3. The appearance distortion of the obstacle on a curved lane detected by a lidar uphill is larger than that one a straight road.

Accordingly, the present invention proposes a map-information obstacle-tracking system and method thereof to effectively overcome the abovementioned problems. The principles and embodiments of the present invention are to be described below.

SUMMARY OF THE INVENTION

The primary objective of the present invention is to provide a map-information obstacle-tracking system and method, wherein the map-information obstacle-tracking system is installed on a vehicle, and is arranged to integrate map-information routes to obtain the information such as the curvatures, slopes, etc. of the curved road ahead, in order to approximate the current position of the obstacle previously predicted by a Kalman filter, making the prediction result matches the actual position of the obstacle even more.

Another objective of the present invention is to provide a map-information obstacle-tracking system and method thereof, wherein the dynamic positioning function and the map-information routes are integrated to acquire the position of a vehicle and the map of the neighboring region and find out the candidate routes for later use. By employing the present invention, the precision of the information enamoring the vehicle may cover a plurality of traffic lanes of a road.

Yet another objective of the present invention is to provide a map-information obstacle-tracking system and method, wherein even though the obstacle exceeds the preset region of interest (ROI) of the sensor, the present invention can still predict the planned routes of the obstacle (front car) and match the obstacle with the front candidate routes to predict the moving trajectory of the obstacle without system dissociation.

In order to achieve the abovementioned objectives, the present invention proposes a map-information obstacle-tracking system, which is installed in a vehicle and comprising a vehicular dynamic positioning module used to acquire the position of the vehicle; a map-information module arranged to acquire the map-information routes of the area neighboring the position of the vehicle; a road routing module comparing the vehicular position acquired by the vehicular dynamic positioning module with the map-information routes acquired by the map-information module to find out a plurality of candidate routes for the vehicle; an obstacle routing module connected with the road routing module, receiving at least one result of obstacle tracking, determining one of the candidate routes where the obstacle appears, and predicting the moving trajectory of the obstacle; and an obstacle information filtering module connected with the obstacle routing module, and estimating the position of the obstacle according to the moving trajectory of the obstacle, and outputting the position of the obstacle.

According to one embodiment of the present invention, the vehicular dynamic positioning module may further acquire the state of the vehicle, including the speed, orientation, position, and moving direction of the vehicle.

According to one embodiment of the present invention, the map-information routes includes central lines, directions, lane marks, signs, curvatures and slopes of roads.

According to one embodiment of the present invention, the map-information obstacle-tracking system further comprises an environment sensing device, which picks up the information of the roads in front of the vehicle to determine whether there is an obstacle in front of the vehicle.

According to one embodiment of the present invention, the results of obstacle tracking include obstacle parameters, such as the position of the obstacle in the longitudinal direction, the moving direction of the obstacle, and the speed of the obstacle.

According to one embodiment of the present invention, the obstacle routing module further comprises a route matching module and a route predicting module. The route matching module receives the results of obstacle tracking and matches the results of obstacle tracking with the candidate routes to find out an obstacle route where the obstacle appears from the plurality of candidate routes. According to the results of obstacle tracking, the route predicting module uses an optimized route equation to predict the moving trajectory of the obstacle in the obstacle route.

According to one embodiment of the present invention, the obstacle routing module further comprises an obstacle tracking module, which is connected with the route matching module and provides the results of obstacle tracking.

According to one embodiment of the present invention, the route predicting module provides the results of predicting the moving trajectory of the obstacle to the obstacle information filtering module; the obstacle information filtering module uses the results of predicting the moving trajectory of the obstacle as the filter parameters to predict the position of the obstacle.

According to one embodiment of the present invention, the map-information obstacle-tracking system further comprises a coordinate transformation module, which is connected with the vehicular dynamic positioning module, the map-information module and the road routing module, and transforms the coordinate system of the vehicular position and the coordinate system of the map-information routes from a global coordinate system to a vehicular coordinate system.

According to one embodiment of the present invention, the map-information obstacle-tracking system further comprises a coordinate transformation module, which is connected with the environment sensing device, and transforms the coordinate system of at least one result of the environment sensing device from a global coordinate system to a vehicular coordinate system, and outputs the vehicular coordinate system to an obstacle judgment module. The obstacle judgment module determines whether there is an obstacle in the front or whether the object in the front is an obstacle. Then, the obstacle judgment module transmits the result of judgment to the obstacle information filtering module.

The present invention also proposes a map-information obstacle-tracking method, which comprises following steps: using a vehicular dynamic positioning module to acquire the position of a vehicle, and using a map-information module to acquire the map-information routes of the area neighboring the vehicle; comparing the vehicular position acquired by the vehicular dynamic positioning module with the map-information routes acquired by the map-information module to find out a plurality of candidate routes for the vehicle; receiving at least one result of obstacle tracking, determining whether the obstacle is in one of the plurality of candidate routes, and predicting the moving trajectory of the obstacle; estimating the position of the obstacle according to the moving trajectory of the obstacle, and outputting the position of the obstacle.

DETAILED DESCRIPTION OF THE INVENTION

The present invention provides a map-information obstacle-tracking system and method thereof, wherein the map-information obstacle-tracking system is installed on a vehicle, and is arranged to integrate map-information routes to obtain the information such as the curvatures, slopes, etc. of the curved road ahead, in order to approximate the current position of the obstacle previously predicted by a Kalman filter, making the prediction result matches the actual position of the obstacle even more.

Figure 1:
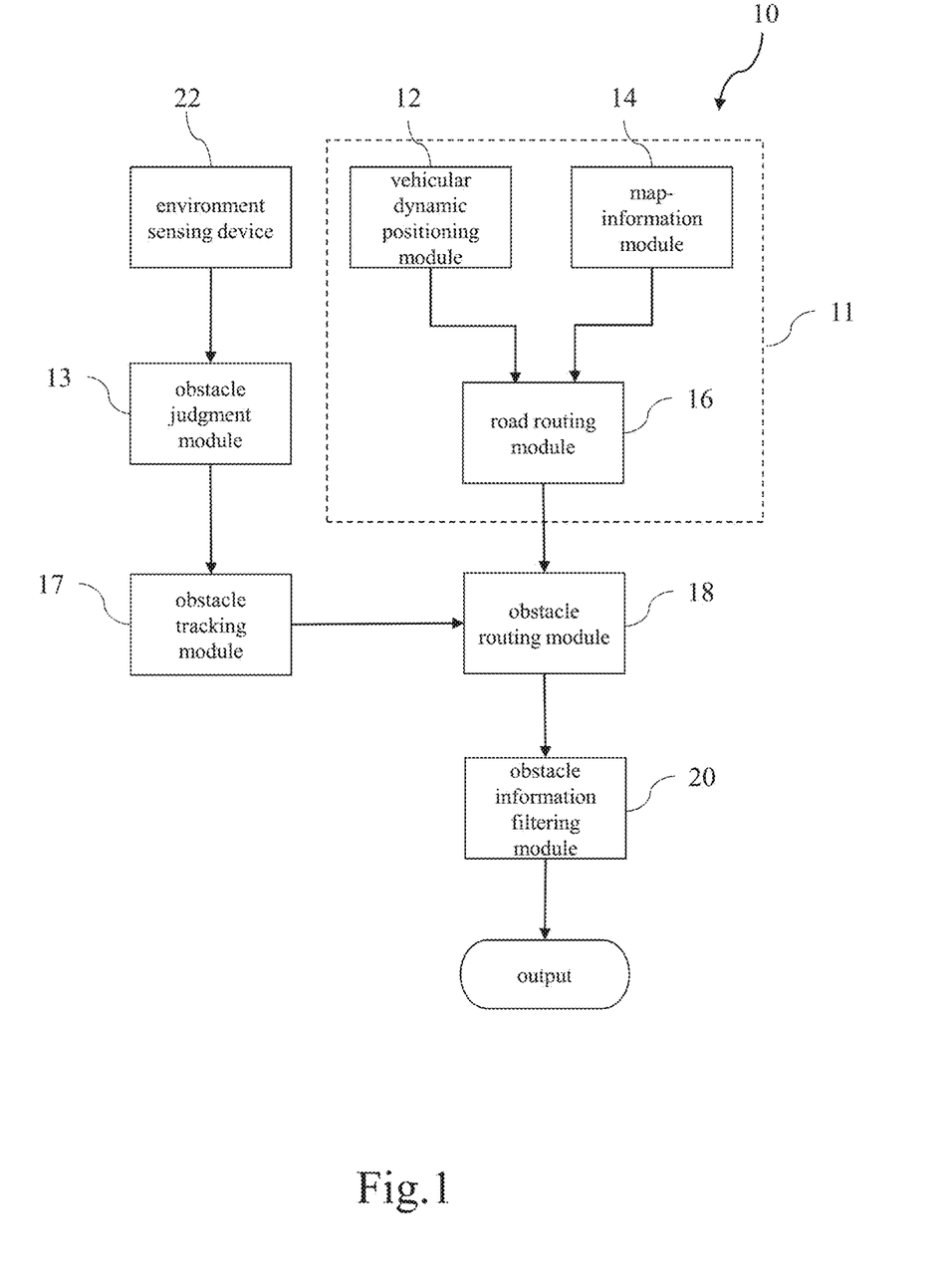
FIG. 1 is a block diagram schematically showing a map-information obstacle-tracking system according to one embodiment of the present invention.

Refer to FIG. 1. FIG. 1 is a block diagram schematically showing the map-information obstacle-tracking system according to one embodiment of the present invention. The map-information obstacle-tracking system 10 of the present invention comprises a pre-processing module 11, an obstacle judgment module 13, an obstacle tracking module 17, an obstacle routing module 18, and an obstacle information filtering module 20. The pre-processing module 11 includes a vehicular dynamic positioning module 12, a map-information module 14, and a road routing module 16, which are used to find out a plurality of candidate routes for the vehicle.

The vehicular dynamic positioning module 12 includes a global positioning system (GPS) for acquiring the position of the vehicle, especially the position in the latitude-longitude coordinate system. The vehicular dynamic positioning module 12 can further acquire the state of the vehicle, such as the dynamic information of the vehicle, including the speed, orientation, position, and moving direction of the vehicle. The map-information module 14 is used to acquire the map-information routes of the area neighboring the vehicle. The map-information routes is the point cloud diagram of the 3D images captured by cameras beforehand, and thus the map-information routes includes central lines, directions, lane marks, signs, and curvatures and slopes of roads. The road routing module 16 compares the vehicular position acquired by the vehicular dynamic positioning module 12 with the map-information routes acquired by the map-information module 14 to find out a plurality of candidate routes for the vehicle. In details, the road routing module 16 finds out the available routes neighboring the vehicle (including a plurality of traffic lanes of an identical road), and then finds out the candidate routes according to the dynamic state of the vehicle (such as the moving direction). The obstacle routing module 18 is connected with the road routing module 16, to receive at least one result of obstacle tracking, determine which one of the plurality of candidate routes the obstacle appears in, and predict the moving trajectory of the obstacle. The obstacle information filtering module 20 is connected with the obstacle routing module 18, to estimate the position of the obstacle according to the moving trajectory of the obstacle, and output the position of the obstacle.

The map-information obstacle-tracking system 10 of the present invention further comprises an environment sensing device 22. The environment sensing device 22 may be at least one of a camera, a radar and a lidar or a combination thereof. The environment sensing device 22 is connected with an obstacle judgment module 13. The environment sensing device 22 picks up the information of the roads ahead the vehicle and outputs the information to the obstacle judgment module 13. Thereby, the obstacle judgment module 13 determines whether there is an obstacle ahead the vehicle or whether the object ahead is an obstacle. As to how the obstacle judgment module 13 determines whether the front object is an obstacle is not a main issue to discuss in the present invention, and therefore it will not be further described herein. The obstacle judgment module 13 is connected with an obstacle tracking module 17. The obstacle tracking module 17 receives the information of the front obstacle determined by the obstacle judgment module 13 and performs obstacle tracking. The results of obstacle tracking include obstacle parameters such as the longitudinal position, the moving direction and the speed of the obstacle.

As to how the obstacle tracking module 17 tracks the trajectory of the front obstacle is not a main issue to discuss in the present invention, and therefore it will not be further described herein. The obstacle tracking module 17 provides the results of obstacle tracking to the obstacle routing module 18.

Figure 2:
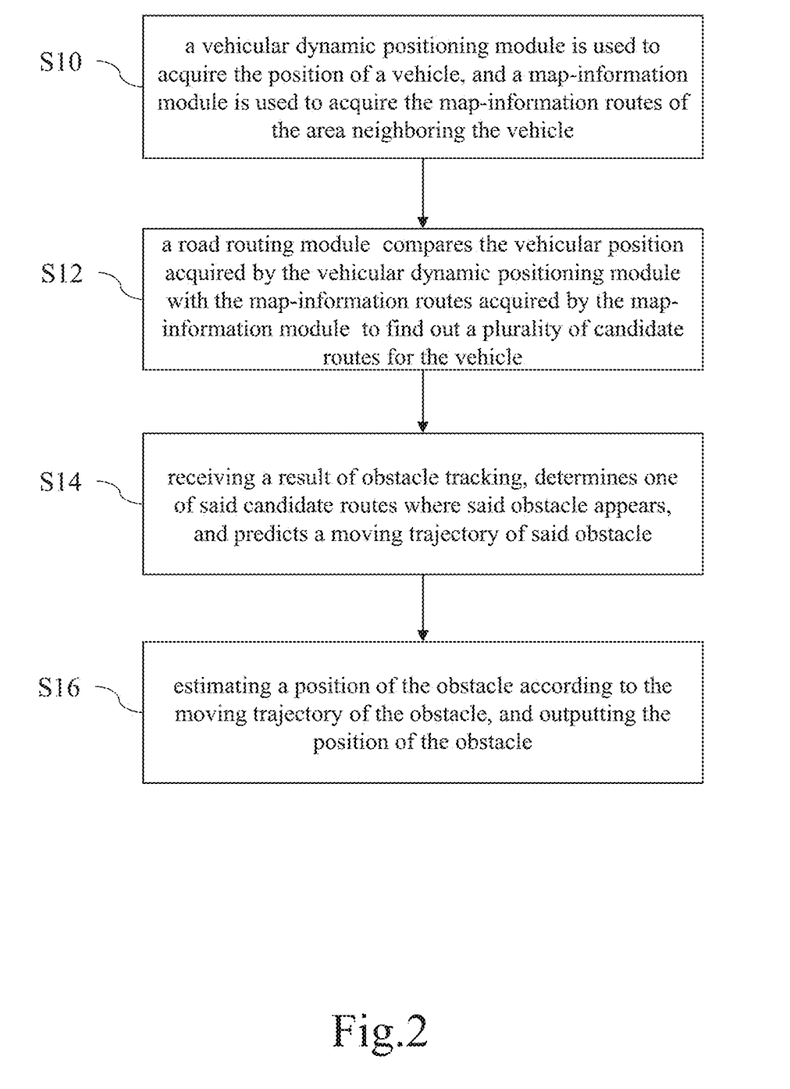
FIG. 2 is a flowchart of a map-information obstacle-tracking method according to one embodiment of the present invention.

FIG. 2 shows a flowchart of a map-information obstacle-tracking method for operating the map-information obstacle-tracking system shown in the block diagram of FIG. 1. In step S10, a vehicular dynamic positioning module 12 is used to acquire the position of a vehicle, which is the latitude-longitude coordinates acquired by the global positioning system (GPS); and a map-information module 14 is used to acquire the map-information routes of the area neighboring the vehicle. In step S12, a road routing module 16 compares the vehicular position acquired by the vehicular dynamic positioning module 12 with the map-information routes acquired by the map-information module 14 to find out a plurality of candidate routes for the vehicle. Step S14 receives a result of obstacle tracking, determines in which one of the candidate routes where the obstacle appears according to the result of obstacle tracking, and predicts a moving trajectory of the obstacle, including the timing when the obstacle enters a curved lane, and possible routes of the obstacle moves in a curved lane. Lastly, in step S16, an obstacle information filtering module estimates the position of the obstacle according to the moving trajectory of the obstacle and outputs the position of the obstacle.

Figure 3A:
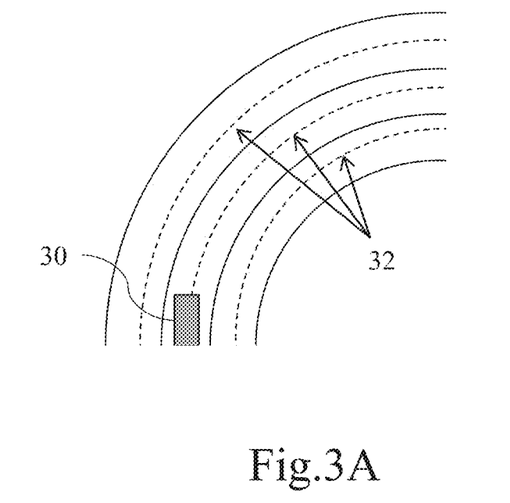
FIG. 3A schematically shows that the road routing module finds the route according to one embodiment of the present invention.
Figure 3B:
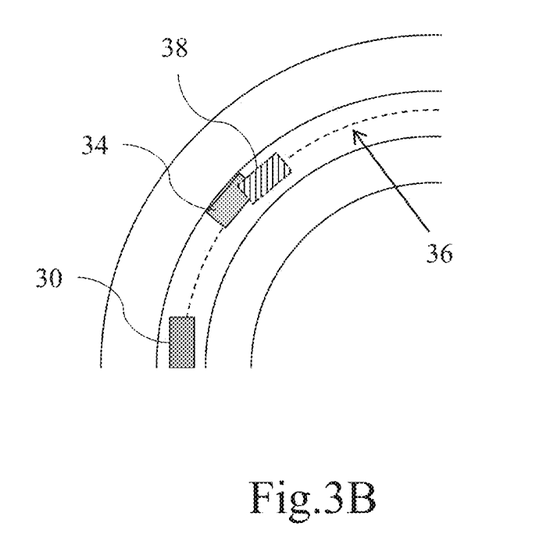
FIG. 3B schematically shows that the road routing module generates an obstacle route and predicts a moving trajectory of the obstacle according to one embodiment of the present invention.

Refer to FIG. 3A. FIG. 3A schematically shows how the road routing module 16 finds the route. The map-information routes shows that there are three road routes 32 nearby a vehicle 30, i.e. there are three traffic lanes. After judgment, it is determined that the three road routes 32 are all candidate routes. Refer to FIG. 3B. The obstacle routing module 18 uses the position of a known obstacle 34 and the road routes 32 to determine an obstacle route 36, which is the route where the obstacle 34 is moving currently, and predict a moving trajectory 38 of the obstacle 34. In FIG. 3B, the moving trajectory 38 of the obstacle 34 predicts the future position of the obstacle 34.

Figure 4:
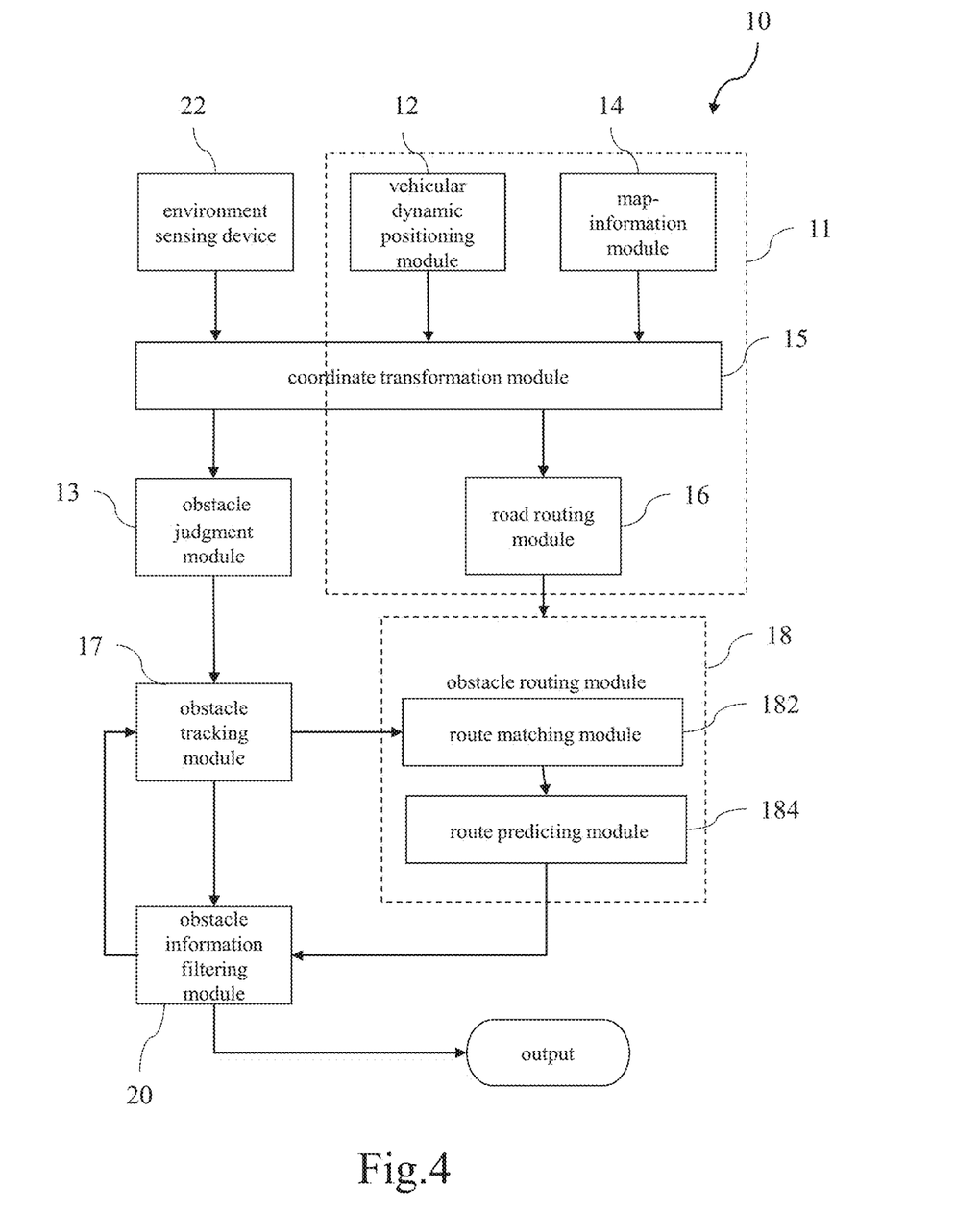
FIG. 4 is a block diagram schematically showing the details of the map-information obstacle-tracking system according to one embodiment of the present invention.

Refer to FIG. 4. FIG. 4 is a block diagram schematically showing the details of the map-information obstacle-tracking system according to one embodiment of the present invention. According to one embodiment of the present invention, the map-information obstacle-tracking system 10 further comprises a coordinate transformation module 15 which is connected with the vehicular dynamic positioning module 12, the map-information module 14 and the road routing module 16, and transforms the coordinate system of the vehicular position provided by the vehicular dynamic positioning module 12 and the coordinate system of the map-information routes provided by the map-information module 14 from a global coordinate system to a vehicular coordinate system, whereby the road routing module 16 can find out the candidate routes in the nearby of the vehicle with the vehicle being the center of the coordinate system. The coordinate transformation module 15 is further connected with the environment sensing device 22 and transforms the coordinate system of the sensation results of the environment sensing device 22 from a global coordinate system to a vehicular coordinate system.

The obstacle routing module 18 further comprises a route matching module 182 and a route predicting module 184. The route matching module 182 receives the results of obstacle tracking, matches the results of obstacle tracking with the candidate routes to find out a candidate route where the obstacle appears from the plurality of candidate routes, and setting the candidate route as an obstacle route. According to the results of obstacle tracking, the route predicting module 184 uses an optimized route equation to predict the moving trajectory of the obstacle in the obstacle route and provides the results of prediction to the obstacle information filtering module 20. The obstacle information filtering module 20 uses the results of prediction as filter parameters to predict the position of the obstacle.

The coordinate transformation module 15 transforms the coordinate system of the sensation results of the environment sensing device 22 into the vehicular coordinate system and then provides the vehicular coordinate system-based sensation results to the obstacle judgment module 13 for judgment. Thus, the obstacle tracking module 17 generates the results of obstacle tracking. The obstacle tracking module 17 is connected with the route matching module 182 and provides the results of obstacle tracking to the route matching module 182.

Figure 5:
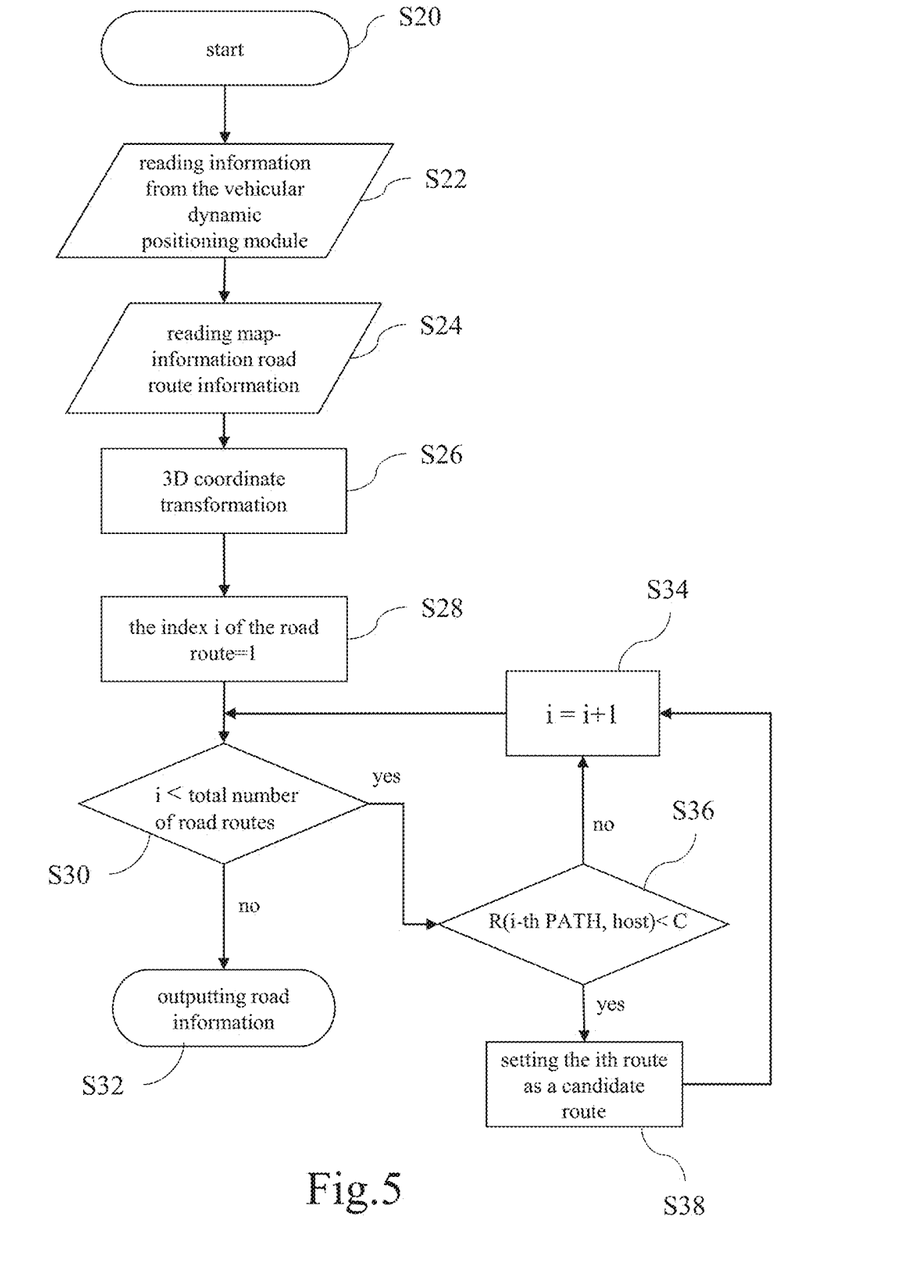
FIG. 5 is a detailed flowchart of finding candidate routes by using the map-information obstacle-tracking method according to one embodiment of the present invention.

FIG. 5 shows a detailed flowchart of a map-information obstacle-tracking method according to one embodiment of the present invention. In the step S20, the process starts, and the pre-processing module 11 is initiated. In the step S22, the road routing module 16 reads information from the vehicular dynamic positioning module 12, including the position of the vehicle and the state of the vehicle. In the step S24, the road routing module 16 reads the map-information routes from the map-information module 14. In the step S26, the coordinate transformation module 15 transforms the vehicular position provided by the vehicular dynamic positioning module 12 and the map-information routes provided by the map-information module 14 from a global coordinate system to a 3D vehicular coordinate system. In steps S28-S38, the road routing module 16 begins to operate and judge the found road routes one by one. In the step S28, the index i of the road route is supposed to be 1 in the beginning In the step S30, determine whether i is smaller than the total amount of the road routes. If not, it means that the number of the road routes is zero, and the process proceeds to the step S32. In the step S32, the road information is outputted. If it is determined in the step S30 that i is smaller than the total amount of the road routes, it means that the route indeed exists, and the process proceeds to the step S36. The step S36 determines whether the distance R between the ith road route and the vehicle (host) is smaller than a preset value. Normally, the preset value is a constant (the width of the road). Suppose that the width of the road is 2 meters. If the distance R is smaller than 2 meters, it indicates that the road route is available for the vehicle. If it is determined in the step S36 that the distance R is larger than the preset value, it indicates that the road route is too far to be used by the vehicle. If the answer of the step S36 is no, the process proceeds to the step S34. In the step S34, i+1=2, and start to judge the second road route. The steps S30-S36 are repeated until the step S30 determines that i is larger than the total number of the road routes (i.e. until all the road routes have been judged). For example, suppose that the total number of the road routes is 3; while i=4 and i>3, it indicates that all the three road routes have been judged; then in the step S32, output the information of the three road routes. In step S38, the ith route is set as the candidate route.

Figure 6:
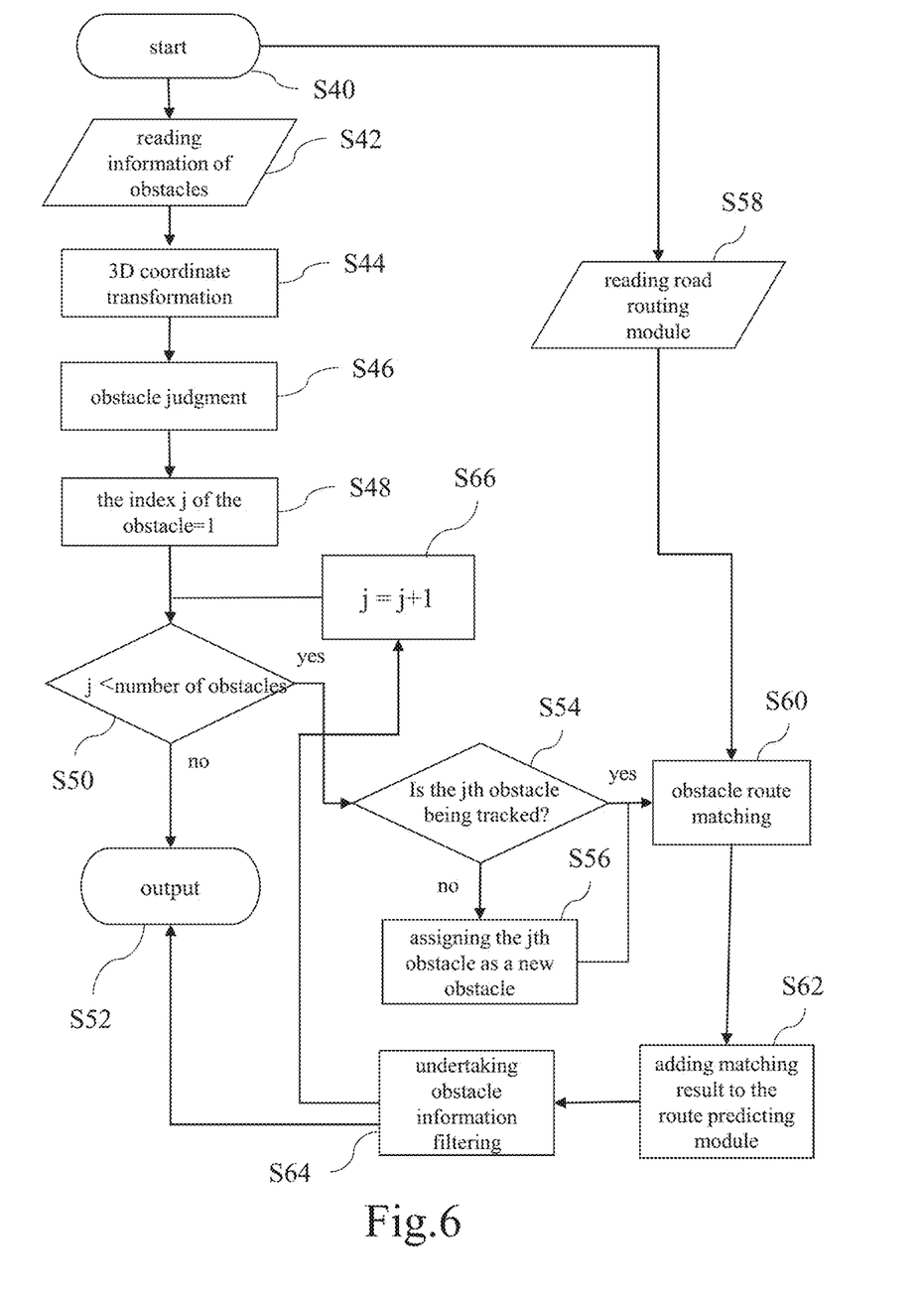
FIG. 6 is a detailed flowchart of performing route matching and route predicting to achieve better results of detecting obstacle positions by using a map-information obstacle-tracking method according to one embodiment of the present invention.

FIG. 6 shows a detailed flowchart of performing route matching and route predicting to achieve better results of detecting obstacle positions in a map-information obstacle-tracking method according to one embodiment of the present invention. In the step S40, the process starts. In the step S42, read the information of the front obstacles detected by the environment sensing device 22. In the step S44, the coordinate transformation module 15 perform a 3D coordinate transformation to transform the information of the front obstacles from a global coordinate system to a vehicular coordinate system. In the step S46, provide the information of the front obstacles to the obstacle judgment module 13 for judgment of obstacles. Step S48 judges the obstacles one by one from the first obstacle. In the step S50, determine whether the subscript j of the obstacle is smaller than the number of the obstacles. If no, it indicates that all the obstacles have been judged, and the process proceeds to the step S52. In the step S52, the results are outputted. If the answer of the step S50 is yes, the process proceeds to the step S54. In step S54, the obstacle tracking module 17 determines whether the jth obstacle is being tracked. If the answer of the step S54 is no, the process proceeds to the step S56, and set the jth obstacle as a new obstacle. If the jth obstacle is being tracked, provide the results of obstacle tracking to the route matching module 182. Then, the process proceeds to steps S58-S60, wherein the route matching module 182 receives the candidate routes from the road routing module 16 and performs route matching of the candidate routes and the results of tracking the jth obstacle to find out the obstacle route (the route where the obstacle appears). In the step S62, add the obstacle route to the route predicting module 184 for predicting the moving trajectory of the obstacle. Then, add the moving trajectory of the obstacle to the obstacle information filtering module 20 for performing filtering and predicting the position of the obstacle. Thus, the information filtering of the jth obstacle has been completed, and the process proceeds to the step S66. In the step S66, the index j is further added with 1. Next, repeat the steps S50-S64 to perform route matching, route prediction, and filtering of the (j+1)th obstacle so as to find out the position of the (j+1)th obstacle. Next, repeat the steps S50-S66 until the step S50 confirms that all the obstacles have been judged, and output the results. The output results are the obstacle positions acquired by the filtering activity.

Obstacle route matching will use an optimized route equation. The result x of obstacle tracking is used in finding an optimized route according to the equation:

$$OP(x) = P_i(x), P_i(x) = \min_{k \in 1,2,...,n} (P_k(x))$$

wherein OP is the optimized route equation; n is the maximum number of the possible routes; $P_{k, k \in 1, ..., n}$ is the route equation. In other words, the present invention selects the route, which matches best in the longitudinal position of the obstacle, the moving direction, the speed, etc., as the result of route matching. The successfully matched route is assigned to be the obstacle route and added to the obstacle parameters. Further, the obstacle route and the dynamic state of the obstacle are used in predicting the obstacle route. The result of prediction is used as the filter parameter. The obstacle information filtering module 20 uses the obstacle parameters and the filter parameters to work out a better detection result, whereby the predicted obstacle position approximates the real obstacle position even more.

In conclusion, the present invention provides a map-information obstacle-tracking system and method, wherein the vehicular dynamic positioning and the map-information routes is used to acquire the position of the vehicle and the map of the neighboring area of the vehicle and find out the available candidate route of the vehicle for later use. By employing the present invention, the precision of the information neighboring the vehicle may cover a plurality of traffic lanes of a road. The accuracy of the candidate routes may involve assigning one of the lanes of the same road. The present invention uses the map-information routes to predict the position of the obstacle and finds out the route (lane) where the obstacle exists. Therefore, the present invention can improve the precision of the current obstacle position detected by the Kalman filter and stabilizes the accuracy of detecting an obstacle in a curved lane. Moreover, even when the obstacle exceeds the preset region of interest (ROI) of the sensor, the system and method provided by the present invention is capable of predicting the possible moving trajectories of the obstacle, and therefore can still pair the obstacle with a suitable candidate route. Hence, the data will not be lost. The embodiments described above are only to exemplify the present invention but not meant to limit the scope of the present invention. Any equivalent modification or variation according to the spirit or characteristics of the present invention should fall within the scope of the present invention.

What is claimed is:

1. A map-information obstacle-tracking system, installed on an on-board system of a vehicle, comprising:
    a global positioning system, used to acquire a position of said vehicle;
    one or more processors, coupled to the global positioning system and arranged to:
    acquire map-information routes of an area neighboring said position of said vehicle;
    compare said position of said vehicle with said map-information routes to find out a plurality of candidate routes of said vehicle;
    receive a result of tracking at least one obstacle, determine one of said candidate routes where said obstacle appears, and predict a moving trajectory of said obstacle; and
    estimate a position of said obstacle according to said moving trajectory of said obstacle, and output said position of said obstacle;
    wherein the processor is arranged to:
    match said result of tracking said obstacle with said candidate routes to find out an obstacle route where said obstacle appears from said candidate routes; and
    p1 use an optimized route equation to predict a moving trajectory along which said obstacle moves in said obstacle route according to said result of tracking said obstacle;
    wherein the plurality of candidate routes of said vehicle are included by a same road.

2. The map-information obstacle-tracking system according to claim 1, wherein said global positioning system is configured to acquire a state of said vehicle, which includes a speed, an orientation, a position and a moving direction of said vehicle.

3. The map-information obstacle-tracking system according to claim 1, wherein said map-information routes comprises central lines, directions, lanes, signs, and curvatures and slopes of roads.

4. The map-information obstacle-tracking system according to claim 1, wherein the processor is arranged to pick up information of roads in front of said vehicle to determine whether said obstacle appears in front of said vehicle.

5. The map-information obstacle-tracking system according to claim 1, wherein said result of tracking said obstacle comprises obstacle following parameters: a longitudinal position, a moving direction, and a speed of said obstacle.

6. The map-information obstacle-tracking system according to claim 1, wherein said processor is arranged to provide a prediction result of said moving trajectory of said obstacle as a filter parameter to predict a position of said obstacle.

7. The map-information obstacle-tracking system according to claim 1, wherein the processor is arranged to transform said position of said vehicle and said map-information routes from a global coordinate system to a vehicular coordinate system.

8. The map-information obstacle-tracking system according to claim 4, wherein the processor is arranged to transform a coordinate system of at least one sensation result from a global coordinate system to a vehicular coordinate system, and output said sensation result in order to judge whether said obstacle appears in the front or whether an object in the front is said obstacle.

9. A map-information obstacle-tracking method, comprising following steps:
 using a global positioning system to acquire a position of a vehicle, and using one or more processors coupled to the global positioning system to acquire map-information routes of an area neighboring said position of said vehicle;
 comparing said position of said vehicle with said map-information routes to find out a plurality of candidate routes of said vehicle;
 receiving a result of tracking an obstacle, determining one of said candidate routes where said obstacle appears, and predicting a moving trajectory of said obstacle; and
 estimating a position of said obstacle according to said moving trajectory of said obstacle, and outputting said position of said obstacle;
wherein said step of predicting a moving trajectory of said obstacle further comprises following steps:
 matching said result of tracking said obstacle with said candidate routes to find out an obstacle route where said obstacle appears from said candidate routes; and
 using an optimized route equation to predict a moving trajectory along which said obstacle moves in said obstacle route according to said result of tracking said obstacle; wherein the plurality of candidate routes of said vehicle are included by a same road .

10. The map-information obstacle-tracking method according to claim 9, wherein said global positioning system further acquires states of said vehicle, comprising a speed, an orientation, a position and a moving direction of said vehicle.

11. The map-information obstacle-tracking method according to claim 9, wherein said map-information routes comprises central lines, directions, lanes, signs, and curvatures of roads.

12. The map-information obstacle-tracking method according to claim 9, further comprising a step: using the processor to pick up information of roads in front of said vehicle for determining whether said obstacle appears in front of said vehicle.

13. The map-information obstacle-tracking method according to claim 9, wherein said result of tracking said obstacle comprises obstacle parameters, comprising a longitudinal position, a moving direction, and a speed of said obstacle.

14. The map-information obstacle-tracking method according to claim 9, wherein a prediction result of said moving trajectory of said obstacle is used as a filter parameter to predict a position of said obstacle.

15. The map-information obstacle-tracking method according to claim 9, further comprising a step: using the processor to transform said position of said vehicle and said map-information routes from a global coordinate system to a vehicular coordinate system.

* * * * *